US011040765B2

(12) United States Patent
Krishnappa et al.

(10) Patent No.: US 11,040,765 B2
(45) Date of Patent: Jun. 22, 2021

(54) ADVANCED COMPOSITE HEATED FLOOR PANEL

(71) Applicant: Goodrich Corporation, Charlotte, NC (US)

(72) Inventors: Aruna Kumar Huluvangala Krishnappa, Bangalore (IN); Guru Prasad Mahapatra, Bangalore (IN)

(73) Assignee: Goodrich Corporation, Charlotte, NC (US)

(*) Notice: Subject to any disclaimer, the term of this patent is extended or adjusted under 35 U.S.C. 154(b) by 100 days.

(21) Appl. No.: 16/135,265

(22) Filed: Sep. 19, 2018

(65) Prior Publication Data

US 2020/0001966 A1 Jan. 2, 2020

(30) Foreign Application Priority Data

Jun. 27, 2018 (IN) ............................ 201841023912

(51) Int. Cl.

*B64C 1/18* (2006.01)
*D03D 15/00* (2006.01)

(Continued)

(52) U.S. Cl.

CPC ............. *B64C 1/18* (2013.01); *D03D 15/267* (2021.01); *D03D 25/005* (2013.01); *F24D 13/024* (2013.01); *H05B 3/34* (2013.01); *B32B 3/12* (2013.01); *B32B 5/245* (2013.01); *B32B 7/12* (2013.01); *B32B 15/14* (2013.01);

(Continued)

(58) Field of Classification Search

None

See application file for complete search history.

(56) References Cited

U.S. PATENT DOCUMENTS 6,743,497 B2* 6/2004 Ueda ........................ B32B 3/12 428/116
7,731,046 B2 6/2010 Johnson (Continued)

FOREIGN PATENT DOCUMENTS

CN 108004637 A 5/2018
WO WO9526877 A1 10/1995

(Continued)

OTHER PUBLICATIONS

Machine translation of CN 108004637 (Year: 2018).*

(Continued)

*Primary Examiner* — Shawn Mckinnon

(74) *Attorney, Agent, or Firm* — Kinney & Lange, P.A.

(57) ABSTRACT

A composite panel suitable for heating an environment includes a face sheet having a 3D woven structure and abutting the environment, and a first core layer positioned on a side of the face sheet opposite the environment. The 3D woven structure includes at least one z-fiber extending in a first direction, the first direction representing a thickness of the face sheet. The woven structure further includes a plurality of weft layers, each having a weft fiber extending in a second direction, and a warp layer disposed between the plurality of weft layers, the warp layer having a warp fiber extending in a third direction. The z-fiber extends along the plurality of weft layers across a full extent of the 3d woven structure in the first direction.

16 Claims, 2 Drawing Sheets

10
E
28
26
22
18
14
12
16
20
24
S

(51) Int. Cl.

| | |
|---|---|
| ***D03D 25/00*** | (2006.01) |
| ***F24D 13/02*** | (2006.01) |
| ***H05B 3/34*** | (2006.01) |
| ***D03D 15/267*** | (2021.01) |
| *B32B 3/12* | (2006.01) |
| *B32B 5/24* | (2006.01) |
| *B32B 7/12* | (2006.01) |
| *B32B 15/14* | (2006.01) |
| *B32B 17/06* | (2006.01) |

(52) U.S. Cl.

CPC ..... *B32B 17/061* (2013.01); *B32B 2262/0269* (2013.01); *B32B 2262/101* (2013.01); *B32B 2262/106* (2013.01); *D10B 2101/06* (2013.01); *D10B 2101/122* (2013.01); *D10B 2331/021* (2013.01); *D10B 2401/16* (2013.01); *D10B 2403/033* (2013.01); *H05B 2203/02* (2013.01); *H05B 2203/026* (2013.01)

(56) References Cited

U.S. PATENT DOCUMENTS

| | | | |
|---|---|---|---|
| 7,988,809 | B2 | 8/2011 | Smith et al. |
| 8,752,279 | B2 | 6/2014 | Brittingham et al. |
| 8,834,985 | B2 | 9/2014 | Preisler et al. |
| 8,926,880 | B2 | 1/2015 | Kolax et al. |
| 9,493,894 | B2 | 11/2016 | Butler et al. |
| 9,593,917 | B2 | 3/2017 | Pilpel |
| 9,914,522 | B2 | 3/2018 | Nehring |
| 2007/0054087 | A1* | 3/2007 | Smith ..................... B32B 5/024 428/116 |
| 2008/0031604 | A1* | 2/2008 | Kerschbaum .......... H05B 3/265 392/435 |
| 2016/0340020 | A1 | 11/2016 | Owens et al. |
| 2016/0361889 | A1 | 12/2016 | Bartolome |

FOREIGN PATENT DOCUMENTS

| | | | |
|---|---|---|---|
| WO | WO2017100900 | A1 | 6/2017 |
| WO | WO2017114416 | A1 | 7/2017 |

OTHER PUBLICATIONS

Extended European Search Report for EP Application No. 19182554.6, dated Nov. 14, 2019, 7 pages.

J. Schuster et al, “Thermal Conductivities of Three-Dimensionally Woven Fabric Composites”, from Composites Science and Technology 68, pp. 2085-2091, 2008.

Communication Pursuant to Article 94(3) EPC for EP Application No. 19182554.6, dated Oct. 1, 2020, 4 pages.

* cited by examiner

ADVANCED COMPOSITE HEATED FLOOR PANEL

CROSS-REFERENCE TO RELATED APPLICATION(S)

This application claims the benefit of India Provisional Application No. 201841023912 filed Jun. 27, 2018 for "ADVANCED COMPOSITE HEATED FLOOR PANEL" by Aruna Kumar Huluvangala Krishnappa and Guru Prasad Mahapatra.

BACKGROUND

Heated floor panels are often used in aircraft to mitigate the effects of cold underfloor temperatures and to help maintain a comfortable cabin temperature. The floor panels are typically supported by an aircraft structure arranged, for example, in a grid-like pattern. The floor panels have structural integrity sufficient to support the weight of people and objects resting on the panels. A face sheet typically forms the top surface of the panel to protect the underlying layers (e.g. weight supporting layers and/or a heating layer) from punctures from high heels, chips from dropped objects, scratches from dragged luggage, and/or other floor-traffic related hazards. Such face sheets can be formed from two-dimensional (2D) fabrics extending, for example, in the x and y planes.

2D fabrics have poor out-of-plane mechanical properties, and are thus vulnerable to surface cracking and/or delamination upon impact loading. Delamination can occur when bonds between individual layers break down from impact or other forces. Seepage and moisture absorption through surface cracks can lead to degradation of panel material properties and subsequent field failures. Further, some underlying layers may be formed from materials with relatively low thermal conductivity, requiring greater power input to the heating element to maintain panel surface temperature. Thus, the need exists for a panel having improved mechanical and thermal properties.

SUMMARY

A composite panel suitable for heating an environment includes a face sheet having a 3D woven structure and abutting the environment, and a first core layer positioned on a side of the face sheet opposite the environment. The 3D woven structure includes at least one z-fiber extending in a first direction, the first direction representing a thickness of the face sheet. The woven structure further includes a plurality of weft layers, each having a weft fiber extending in a second direction, and a warp layer disposed between the plurality of weft layers, the warp layer having a warp fiber extending in a third direction. The z-fiber extends along the plurality of weft layers across a full extent of the 3d woven structure in the first direction.

A method of forming a composite panel suitable for heating an environment includes positioning a face sheet having a 3D woven structure in communication with the environment, and positioning a first core layer on a side of the face sheet opposite the environment. The 3D woven structure includes at least one z-fiber extending in a first direction, the first direction representing a thickness of the face sheet. The woven structure further includes a plurality of weft layers, each having a weft fiber extending in a second direction, and a warp layer disposed between the plurality of weft layers, the warp layer having a warp fiber extending in a third direction. The z-fiber extends along the plurality of weft layers across a full extent of the 3D woven structure in the first direction.

DETAILED DESCRIPTION

The present invention is directed to a composite panel, and more specifically, to a heated floor panel with a three-dimensional (3D) woven face sheet. The face sheet includes three orthogonal fiber components in multiple layers. Binding "z-fibers" interlock the other layers to prevent delamination. The panel further includes a metallic core layer above the heating element, which, along with the z-fibers, improves thermal conductivity to the panel surface.

Figure 1:
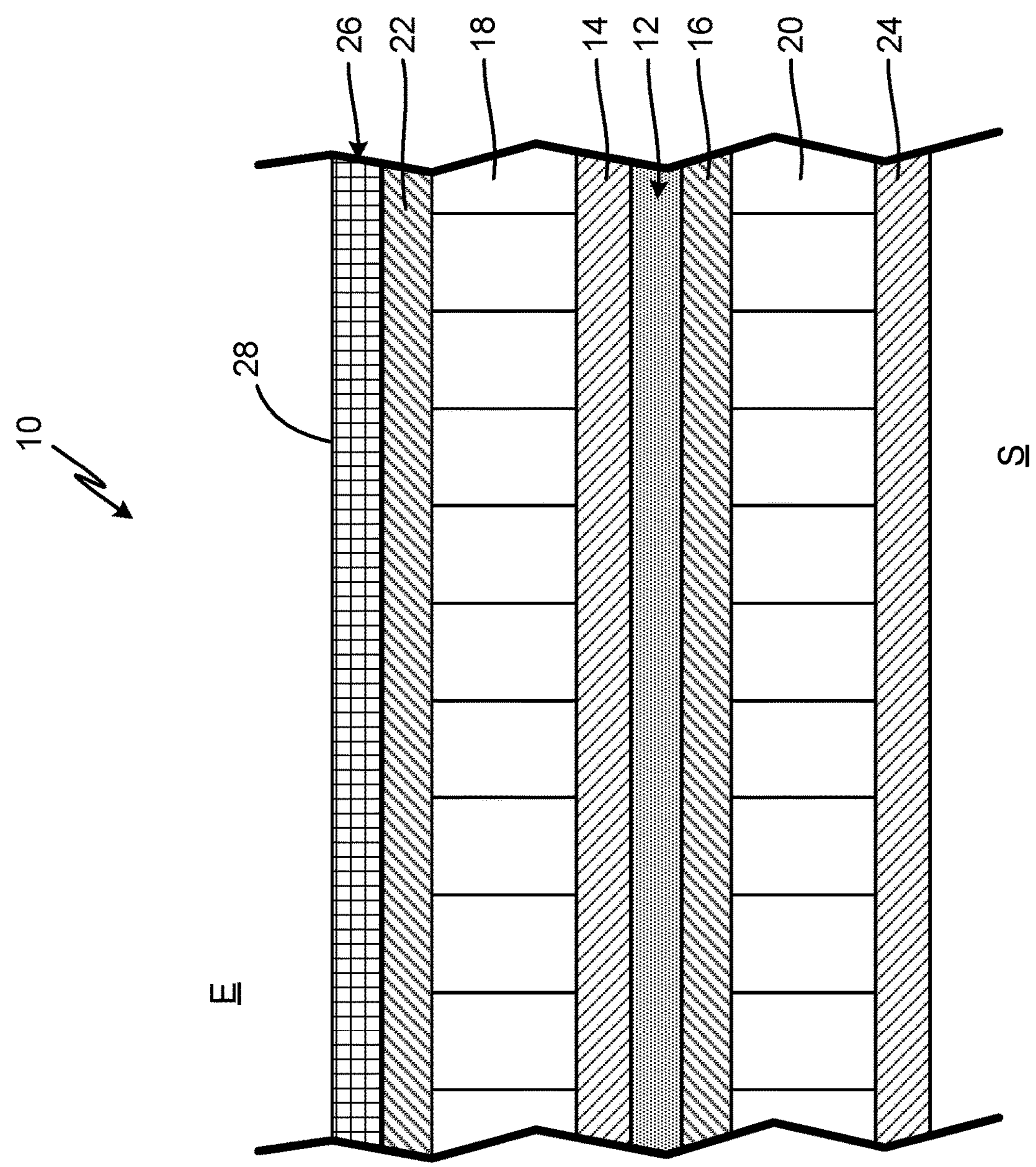
FIG. 1 is a simplified cross-sectional view showing the various layers of a composite panel.

FIG. 1 is a simplified cross-section of composite panel 10. Panel 10 includes heating layer 12, adhesive layers 14 and 16, honeycomb core layers 18 and 20, structural layers 22 and 24, and face sheet 26. Surface 28 of face sheet 26 represents the upper (external) surface of panel 10. Panel 10 is positioned over substrate S, and provides heat to environment E, which is located on a side of panel 10 opposite substrate S.

Heating layer 12 can include a thermoelectric heating element (not shown). The heating element can be a resistive heating element formed, for example, from a metallic material, Positive Temperature Control (PTC) ceramic, PTC polymer, or carbon allotrope material. The heating element can be arranged as an etched foil, wire, or printed-ink element. Other suitable heating elements are contemplated herein. Heating layer 12 can be used to control the temperature of surface 28 of panel 10, which can be installed, for example, in an aircraft cabin or cockpit. In certain embodiments, the heating element can extend across the entire area of heating layer 12. In other embodiments, the heating element can be inset some distance from the edges of heating layer 12 in order to protect the element from fluid spills along or damage at the edges of panel 10.

Core layers 18 and 20 provide impact resistance to panel 10, and carry shear loads to stiffen floor panel 10. Upper core layer 18 can, in an exemplary embodiment, be a high-density honeycomb core formed from a metallic material, such as aluminum. Lower core layer 20 can be formed from an expanded honeycomb polymer, such as aramids (e.g., Kevlar® or Nomex®), as well as an open-cell or closed-cell polymer foam. Generally speaking, metallic upper core layer 18 has greater thermal conductivity than polymer lower core layer 20, which improves the heat transfer properties of panel 10 in the direction of surface 28, where heating is desired. In another embodiment, however, both core layers 18 and 20 can be formed from the same material (e.g., metal or polymer), and such an arrangement will depend on factors such as weight limitations and panel heating/insulation requirements.

Adhesive layers 14 and 16 can be located between heating layer 12 and core layers 18 and 20, respectively, to help secure the core structure about the heating layer. Adhesive layers 14 and 16 can include film adhesives (e.g., epoxy) or a prepreg (composite fibers impregnated with a matrix material) having a high resin content. Additional and/or alternative adhesive layers can be positioned at other locations between or within layers to further solidify panel structure.

Structural layers 22 and 24 provide additional reinforcement to panel 10. Structural layers 22 and 24 can be a reinforced polymer, such as a carbon fiber or fiberglass impregnated with a resin system such as epoxy, polyurethane, phenolic, cyanate ester, bismaleimide, or other appropriate resins. Each of structural layers 22 and 24 can include a single ply, or a plurality of plies, depending on, for example, the material chosen to form the structural layers, or the particular need for reinforcement. Additional and/or alternative structural layers can also be added in other embodiments.

Figure 2:
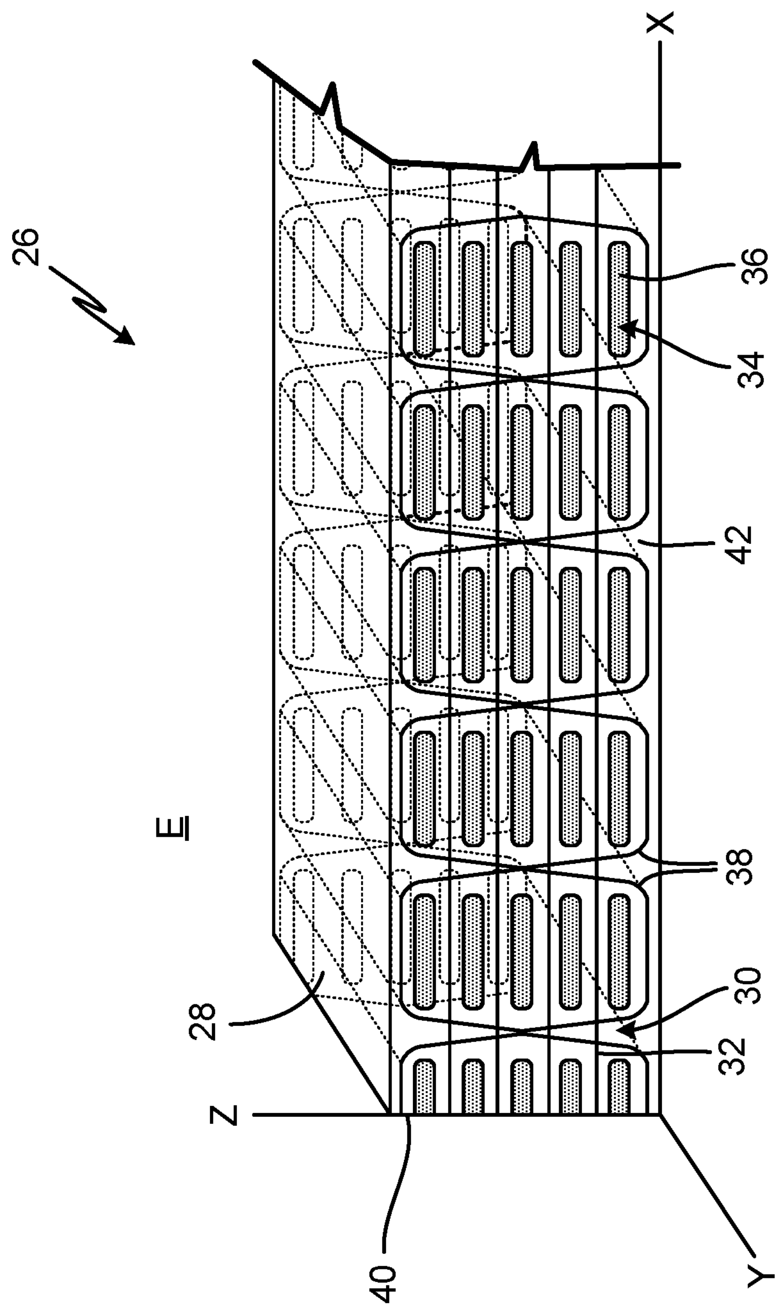
FIG. 2 is a simplified cross-sectional view of a 3D woven face sheet belonging to the composite panel.

FIG. 2 is a simplified cross-sectional view of face sheet 26, shown for simplicity without the other layers of panel 10. Face sheet 26 provides structural support, and more specifically, impact strength to panel 10 on the side of panel 10 exposed to environment E, which can be, for example, an aircraft cabin, cockpit, or other compartment. In an exemplary embodiment, face sheet 26 is structured as a 3D woven composite, having fiber components in three, generally orthogonal axes (x, y, z) as labeled in FIG. 2. Face sheet 26 includes a plurality of warp layers 30 extending along the x-axis. Each warp layer 30 can be formed from a single warp fiber 32, or from a number of warp fibers 32 arranged, for example, as a bundle of fibers (e.g., yarn). Weft layers 34 extend along the y-axis in an alternating fashion with warp layers 30. Weft layers 34 can also be formed from one or more weft fibers 36.

Face sheet 26 further includes at least one z-fiber 38 extending along the z-axis, which, as shown, is the thickness direction of face sheet 26. In the embodiment shown, one z-fiber 38 extends from an uppermost weft layer 34 (relative to surface 28) along the plurality of weft layers 34 and crosses along the neighboring, lowermost weft layer 34. A second z-fiber 38 traverses the thickness of face sheet in the opposite direction, such that the two z-fibers 38 cross one another between individual weft columns 40 (i.e. "stacks" of individual weft layers 34 in the thickness direction), thus interlocking and securing weft layers 34 through the thickness of face sheet 26. This particular arrangement of fibers is generally known as orthogonal fiber architecture. In an alternative embodiment, the weft, warp, and z-fiber components can be arranged differently, for example, in a ply-to-ply interlock architecture, or a through-thickness angle interlock architecture, depending on such factors as manufacturing capabilities, fiber materials, or desired in-plane and/or out-of-plane mechanical properties of face sheet 26.

The various fibers of face sheet 26 can be formed from different materials depending on the composite scale of the face sheet. For example, where face sheet 26 is formed as a nanocomposite, warp fibers 32 and weft fibers 36 can be formed from glass, aramid, carbon, or metallic materials, while z-fibers 38 can be formed from steel nanotubes or carbon nanotubes. For larger (e.g., macro) scale composites, warp fibers 32, weft fibers 36, and z-fibers 38 can be formed from glass, aramid, or metallic materials. Other suitable high-strength, high-stiffness, and low-density materials are contemplated herein. Face sheet 26 can further be reinforced with polymer matrix 42, represented in FIG. 2 as the space between the warp, weft, and z-fibers. Matrix 42 can be formed from a thermoplastic, such as polyether ether ketone (PEEK) or polycarbonate, or a thermoset, such as epoxy or phenolic resin.

The 3D woven structure and matrix 42 give face sheet 26 improved damage tolerance over 2D structures. Z-fibers 38, for example, secure weft layers 34 along the thickness direction to help prevent separation of individual warp and weft layers. Further, z-fibers 38 can absorb energy in the thickness direction and facilitate impact force dissipation. Matrix 42 helps bind the fiber components and maintain the shape of face sheet 26. Matrix 42 also helps transfer loads to the fiber components. Face sheet 26 also has improved thermal conductivity due to the presence of z-fibers 38, which can be formed from relatively thermally conductive materials (e.g. carbon, metals, etc.) when compared to matrix 42, and help transfer heat radiating upward (along the z-axis) from heating layer 12 to surface 28 and environment E. The thickness of face sheet 26 can be varied to further optimize its thermal and mechanical properties.

The disclosed panel is highly impact resistant due to the 3D woven structure of face sheet 10. The combination of face sheet 26 and metallic upper core layer 18 also offer improved thermal conductivity, which lead to reduced power requirements for the heating element(s) within heating layer 12. The high strength to weight ratio of panel 10 makes it ideal for aerospace applications, but it can also be used in maritime, railroad, and automotive applications, as well as the construction industry.

Discussion of Possible Embodiments

The following are non-exclusive descriptions of possible embodiments of the present invention.

A composite panel suitable for heating an environment includes a face sheet having a 3D woven structure and abutting the environment, and a first core layer positioned on a side of the face sheet opposite the environment. The 3D woven structure includes at least one z-fiber extending in a first direction, the first direction representing a thickness of the face sheet. The woven structure further includes a plurality of weft layers, each having a weft fiber extending in a second direction, and a warp layer disposed between the plurality of weft layers, the warp layer having a warp fiber extending in a third direction. The z-fiber extends along the plurality of weft layers across a full extent of the 3d woven structure in the first direction.

The panel of the preceding paragraph can optionally include, additionally and/or alternatively, any one or more of the following features, configurations and/or additional components:

In the above panel, the first core layer can include a high-density honeycomb core formed from aluminum.

Any of the above panels can further include a second core layer disposed on a side of the first core layer opposite the face sheet.

In any of the above panels, the second core layer can include a polymer foam or a polymer honeycomb.

In any of the above panels, the at least one z-fiber can be formed from a glass, aramid, or metallic material.

In any of the above panels, the at least one z-fiber can include a nanostructure formed from steel nanotubes or carbon nanotubes.

In any of the above panels, the at least one z-fiber can include a plurality of z-fibers.

In any of the above panels, the weft fiber can be formed from a glass, aramid, or metallic material.

In any of the above panels, the warp fiber can be formed from a glass, aramid, or metallic material.

In any of the above panels, the face sheet can further include a matrix formed from a thermoset or thermoplastic material.

In any of the above panels, the z-fiber can have a higher thermal conductivity than the matrix.

In any of the above panels, the first, second, and third directions are orthogonal to one another.

Any of the above panels can further include a first reinforcing layer abutting the first core layer, and a second reinforcing layer abutting the second core layer.

In any of the above panels, the environment can be an aircraft compartment.

A method of forming a composite panel suitable for heating an environment includes positioning a face sheet having a 3D woven structure in communication with the environment, and positioning a first core layer on a side of the face sheet opposite the environment. The 3D woven structure includes at least one z-fiber extending in a first direction, the first direction representing a thickness of the face sheet. The woven structure further includes a plurality of weft layers, each having a weft fiber extending in a second direction, and a warp layer disposed between the plurality of weft layers, the warp layer having a warp fiber extending in a third direction. The z-fiber extends along the plurality of weft layers across a full extent of the 3D woven structure in the first direction.

The method of the preceding paragraph can optionally include, additionally and/or alternatively, any one or more of the following features, configurations and/or additional components:

In the above method, the first core layer can include a high-density honeycomb core formed from aluminum.

In any of the above methods, the at least one z-fiber can be formed from a glass, aramid, or metallic material.

In any of the above methods, the at least one z-fiber can include a nanostructure formed from steel nanotubes or carbon nanotubes.

In any of the above methods, the weft fiber and the warp fiber can be formed from a glass, aramid, or metallic material.

In any of the above methods, the face sheet further can include a matrix formed from a thermoset or thermoplastic material.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A composite panel suitable for heating an environment, the panel comprising:

- a face sheet abutting the environment and comprising a 3D woven structure, the 3D woven structure comprising:
  - at least one z-fiber extending in a first direction, the first direction representing a thickness of the face sheet;
  - a plurality of weft layers, each of the weft layers comprising a weft fiber extending in a second direction;
  - a warp layer disposed between the plurality of weft layers, the warp layer comprising a warp fiber extending in a third direction;
  - wherein the at least one z-fiber extends along the plurality of weft layers across a full extent of the 3D woven structure in the first direction;
- a first core layer positioned on a side of the face sheet opposite the environment, the first core layer comprising a high-density honeycomb core formed from aluminum; and
- a second core layer disposed on a side of the first core layer opposite the face sheet, the second core layer comprising one of a polymer foam and a polymer honeycomb.

2. The panel of claim 1, wherein the at least one z-fiber is formed from a glass, aramid, or metallic material.

3. The panel of claim 1, wherein the at least one z-fiber comprises a nanostructure formed from steel nanotubes or carbon nanotubes.

4. The panel of claim 1, wherein the at least one z-fiber comprises a plurality of z-fibers.

5. The panel of claim 1, wherein the weft fiber is formed from a glass, aramid, or metallic material.

6. The panel of claim 1, wherein the warp fiber is formed from a glass, aramid, or metallic material.

7. The panel of claim 1, wherein the face sheet further comprises a matrix formed from a thermoset or thermoplastic material.

8. The panel of claim 7, wherein the z-fiber has a higher thermal conductivity than the matrix.

9. The panel of claim 1, wherein the first, second, and third directions are orthogonal to one another.

10. The panel of claim 1 and further comprising: a first reinforcing layer abutting the first core layer, and a second reinforcing layer abutting the second core layer.

11. The panel of claim 1, wherein the environment is an aircraft compartment.

12. A method of forming a composite panel suitable for heating an environment, the method comprising:

- positioning a face sheet in communication with the environment, the face sheet comprising a 3D woven structure; the 3D woven structure comprising:
  - at least one z-fiber extending in a first direction, the first direction representing a thickness of the face sheet;
  - a plurality of weft layers, each of the weft layers comprising a weft fiber extending in a second direction;
  - a warp layer disposed between the plurality of weft layers, the warp layer comprising a warp fiber extending in a third direction;
  - wherein the at least one z-fiber extends along the plurality of weft layers across a full extent of the 3D woven structure in the first direction;
- positioning a first core layer on a side of the face sheet opposite the environment, the first core layer comprising a high-density honeycomb core formed from aluminum; and
- positioning a second core layer on a side first core layer opposite the face sheet, the second core layer comprising one of a polymer foam and a polymer honeycomb.

13. The method of claim 12, wherein the at least one z-fiber is formed from a glass, aramid, or metallic material.

14. The method of claim 12, wherein the at least one z-fiber comprises a nanostructure formed from steel nanotubes or carbon nanotubes.

15. The method of claim 12, wherein the weft fiber and the warp fiber are formed from a glass, aramid, or metallic material.

16. The method of claim 12, wherein the face sheet further comprises a matrix formed from a thermoset or thermoplastic material.

* * * * *